United States Patent Office 2,735,852
Patented Feb. 21, 1956

2,735,852
SUBSTITUTED TETRAZOLINES

Robert M. Herbst, East Lansing, Mich.

No Drawing. Application August 10, 1954
Serial No. 449,030

18 Claims. (Cl. 260—308)

This application is a continuation-in-part of my co-pending application, Serial No. 229,295, filed May 31, 1951, now abandoned.

The present invention relates to substituted tetrazolines and methods for obtaining the same. More particularly, the invention relates to 1,4-di-substituted 5-imino-$\Delta^2$-tetrazolines characterized by a higher alkyl substituent in the 1-position and an unsubstituted or a substituted aralkyl group in the 4-position. This particular class of compounds has, in the free base form, the general structural formula,

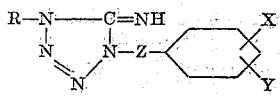

where X and Y are the same or different and represent hydrogen, halogen, hydroxy, lower alkyl, lower alkoxy or nitro groups; Z is a divalent alkylene group containing from 1 to 4 carbon atoms inclusive; and R is an alkyl group containing from 5 to 17 carbon atoms inclusive. These new $\Delta^2$-tetrazoline compounds in the free base form are basic in nature and form well-defined acid-addition salts with both organic and inorganic acids. Some examples of these acid addition salts are the hydrochloride, hydrobromide, sulfate, acetate, citrate, sulfamate and the like salts.

In accordance with the invention compounds of the above-mentioned class can be obtained by condensing a 5-aminotetrazole compound of formula,

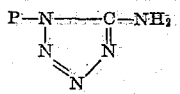

where P is an alkyl radical containing 5 to 17 carbon atoms inclusive or an aralkyl radical of formula,

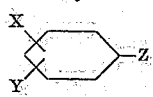

with an aralkyl halide of formula,

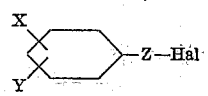

in the case where P in the 5-aminotetrazole compound is an alkyl radical and with an alkyl halide of formula, R—Hal in the case where P in the 5-aminotetrazole compound is an aralkyl radical; where Hal is a halogen atom and R, X, Y and Z have the same significance as given above. These transformations can be diagrammatically illustrated as follows:

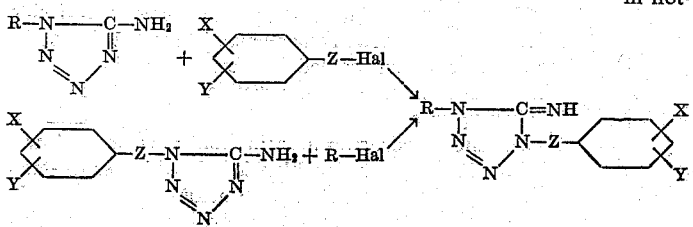

where R, X, Y, Z and Hal have the same significance as given above.

The above-mentioned condensation can be carried out in the presence of an organic solvent which is inert in the reaction, such as benzene, xylene, toluene, ethanol, butanol, isopropanol and the like. The reaction can also be carried out in the presence or absence of a basic catalyst. If a basic catalyst is employed, the 1-alkyl-4-aralkyl-5-imino-$\Delta^2$-tetrazoline product is present in the reaction mixture in its free base form, while if no basic catalyst is used it is present in the reaction mixture as the hydrohalide salt. Either organic or inorganic basic catalysts can be used in the process. Some examples of the materials which are suitable for this purpose are pyridine, triethylamine, potassium carbonate, sodium bicarbonate, N-ethylpiperidine and the like. The temperature can be varied within quite wide limits depending upon the mode of carrying out the condensation, temperatures varying from 50–160° C. being suitable. When no solvent or basic catalyst is employed, best results can be obtained by using a temperature in the neighborhood of 110–150° C. and preferably in the range of 120–130° C.

The products of the invention possess an unusually high degree of germicidal activity. They exert their germicidal effect even in high dilutions and hence, are particularly valuable as sterilizing agents. In addition, the products of the invention possess a high degree of activity against *Trichomonas vaginalis*, *Trichomonas foetus* and *Canida albicans*. For therapeutic purposes the acid addition salts are preferred because of their solubility properties.

The preferred products of the invention are the acid addition salts of 4-aralkyl- and 4-(p-haloaralkyl)-5-imino-1-n-octyl-$\Delta^2$-tetrazolines, and in particular, the 4-benzyl- and 4-(p-chlorobenzyl)-5-imino-1-n-octyl-$\Delta^2$-tetrazolines in hydrohalic acid addition salt form.

The invention is illustrated by the following examples:

EXAMPLE 1

*1-n-octyl-4-benzyl-5-imino-$\Delta^2$-tetrazoline*

(a) 15 g. of 1-n-octyl-5-aminotetrazole is mixed with 11.4 g. of benzyl chloride and the mixture heated in an oil bath at 120–125° C. for about eight hours. The mixture is cooled and the solid cake dissolved in 100 ml. of 95% ethanol. The solution is warmed, diluted with 300 ml. of water, decolorized with charcoal and filtered. The product crystallizes on cooling and is separated by filtration, washed with dilute ethanol and then dried in air. The crude product is washed with benzene to remove any unreacted benzyl chloride and recrystallized from a mixture consisting of 170 ml. of water, 85 ml. of 95% ethanol and 2.5 ml. of concentrated hydrochloric acid, specific gravity 1.18. The product so obtained is 1-n-octyl-4-benzyl-5-imino-$\Delta^2$-tetrazoline hydrochloride; M. P. 163–4° C. The formula of the product is

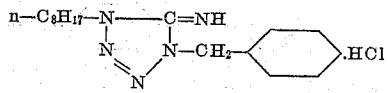

2 g. of 1-n-octyl-4-benzyl-5-imino-$\Delta^2$-tetrazoline (prepared, for example, by dissolving the hydrochloride salt in hot water containing a small amount of ethanol, making the solution alkaline with 20% aqueous sodium hydroxide, extracting the free base with benzene, drying the extract and removing the benzene by distillation in vacuo) is treated with an excess of concentrated aqueous solution of tartaric acid and the mixture concentrated to the point of crystallization. The hydrated complex salt of 1-n-octyl-4-benzyl-5-imino-$\Delta^2$-tetrazoline containing two moles of tartaric acid and one mole of water to each mole of base, is collected and recrystallized from ethyl acetate; M. P. 79–80° C.

(b) A mixture consisting of 4 g. of 1-n-octyl-5-aminotetrazole and 4 g. of benzyl bromide is heated at 125° C. for six hours. The reaction mixture becomes a clear homogeneous melt from which the hydrobromide salt gradually separates in crystalline form. The crude hydrobromide salt of 1-n-octyl-4-benzyl-5-imino-$\Delta^2$-tetrazoline so obtained is collected and purified by recrystallization from 50% ethanol acidified with hydrobromic acid; M. P. 165.5–166.5° C. The formula of the product is

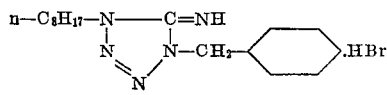

The reaction in accordance with the invention can also be carried out with aralkyl halides containing as ring substituents hydroxy, nitro, lower alkyl and alkoxy groups, the terms "lower alkyl" and "lower alkoxy" referring to groups having not more than four alkyl carbon atoms. For example, when using p-ethyl-benzyl chloride in accordance with the foregoing example, the product is 1-n-octyl-4-p-ethylbenzyl-5-imino-$\Delta^2$-tetrazoline which has the formula,

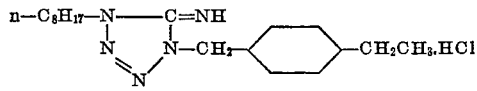

EXAMPLE 2

*1-n-octyl-4-p-chlorobenzyl-5-imino-$\Delta^2$-tetrazoline*

(a) A mixture consisting of 15 g. of 1-n-octyl-5-aminotetrazole and 15 g. of p-chlorobenzyl chloride is heated at 120–125° C. for eight to ten hours. The reaction mixture is cooled, taken up with a minimum amount of hot ethanol and the solution diluted to 400 ml. with water. The reaction mixture is distilled to remove the ethanol and the unreacted p-chlorobenzyl chloride. The aqueous residue is made strongly alkaline to litmus with 25% sodium hydroxide solution, and then extracted with benzene. The benzene extracts are concentrated in vacuo and the residue is taken up in 75 ml. of 95% ethanol. The solution is treated with 15 ml. of concentrated hydrochloric acid, the mixture heated to boiling and then diluted with 75 ml. of water. The crude hydrochloride salt of 1-n-octyl-4-p-chlorobenzyl-5-imino-$\Delta^2$-tetrazoline which separates on cooling is purified by recrystallization from aqueous ethanol; M. P. 165.5–166.5° C. The formula of this product is,

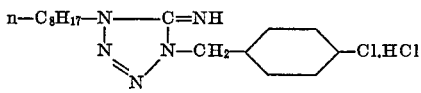

(b) A mixture consisting of 15.8 g. of 1-n-octyl-5-aminotetrazole and 14.1 g. of p-chlorobenzyl chloride is heated at 125° C. for 4 hours. The reaction mixture is cooled, taken up in 75 ml. of 95% ethanol, diluted to 500 ml. with water and distilled to remove the ethanol and unreacted p-chlorobenzyl chloride. The aqueous residue is made alkaline by addition of a solution of 15 g. of sodium hydroxide in 50 ml. of water and extracted successively with four portions (1×100 ml.; 3×50 ml.) of benzene. The combined benzene extracts are dried over anhydrous potassium carbonate, filtered and concentrated by distillation in vacuo. The residual product so obtained is 1-n-octyl-4-p-chlorobenzyl-5-iminotetrazoline. If desired, the product can be purified by recrystallization from n-hexane; M. P. 52–53° C. The formula of the product is,

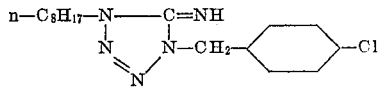

EXAMPLE 3

*1-n-octyl-4-o-chlorobenzyl-5-imino-$\Delta^2$-tetrazoline*

A mixture consisting of 5 g. of 1-n-octyl-5-amino-tetrazole and 4.5 g. of o-chlorobenzyl chloride is heated at 125° C. for six to eight hours, cooled, and the reaction mixture taken up in hot ethanol. The ethanolic solution is diluted with water and then distilled to remove the ethanol and any unreacted o-chlorobenzyl chloride. The aqueous residue is cooled, made alkaline with sodium hydroxide solution and the aqueous mixture extracted with benzene. The benzene is removed by distillation in vacuo and the residual free base of 1-n-octyl-4-o-chlorobenzyl-5-imino-$\Delta^2$-tetrazoline taken up in 95% ethanol. The solution is treated with an excess of concentrated hydrochloric acid, heated to boiling and then diluted with water. The hydrochloride salt which separates on cooling is purified by recrystallization from aqueous ethanol. The product thus obtained is 1-n-octyl-4-o-chlorobenzyl-5-imino-$\Delta^2$-tetrazoline hydrochloride; M. P. 166.5–167° C. The formula of the product is,

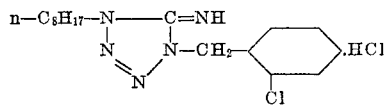

EXAMPLE 4

*1-n-undecyl-4-benzyl-5-imino-$\Delta^2$-tetrazoline*

12 g. of 1-n-undecyl-5-aminotetrazole is mixed with 7.6 g. of benzyl chloride and the mixture heated at 120–125° C. for seven to eight hours. The reaction mass is dissolved in a small amount of hot ethanol, diluted to 500 ml. with water and the solution distilled to remove the ethanol and unreacted benzyl chloride. The residue is made strongly alkaline by the addition of sodium hydroxide solution, cooled and extracted with benzene. The benzene extracts are dried and the benzene is removed by distillation. The residue is taken up into 50 ml. of isopropanol and 10 ml. of concentrated hydrochloric acid and the solution is diluted with 50 ml. of water. The crude hydrochloride which separates is collected and recrystallized from acidified aqueous ethanol. The product is 1-n-undecyl-4-benzyl-5-imino-$\Delta^2$-tetrazoline hydrochloride; M. P. 154–155° C. The formula of the product is,

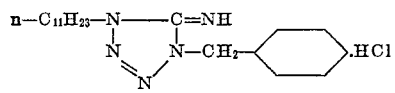

EXAMPLE 5

*1-n-heptadecyl-4-benzyl-5-imino-$\Delta^2$-tetrazoline*

A mixture consisting of 9.7 g. of 1-n-heptadecyl-5-aminotetrazole and 4.6 g. of benzyl chloride is heated at 125° C. for eight hours. The product is then taken up in hot ethanol, diluted with water and the mixture distilled to remove the ethanol and unreacted benzyl chloride. The hot residue is made alkaline with 25% sodium hydroxide solution, cooled and extracted with benzene. The benzene is removed by distillation and the residue is taken up in a mixture of isopropanol and an excess of concentrated hydrochloric acid and then diluted with water. The crude hydrochloride salt which separates is collected and recrystallized from acidified ethanol. The product is 1-n-heptadecyl-4-benzyl-5-imino-$\Delta^2$-tetrazoline hydrochloride; M. P. 145–146° C. The formula of the product is,

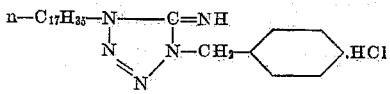

EXAMPLE 6

1-n-octyl-4-m-xylyl-5-imino-Δ²-tetrazoline

A mixture consisting of 8 g. of 1-n-octyl-5-amino-tetrazole and 8.9 g. of m-xylylbromide is heated at 125–130° C. for about six hours. During the heating period, the reactants fuse together to form a clear homogeneous melt from which the hydrobromide salt of 1-n-octyl-4-xylyl-5-imino-Δ²-tetrazoline gradually crystallizes. The crude hydrobromide is taken up in hot ethanol, the solution diluted with water and subjected to steam distillation. The residue is made alkaline by the addition of sodium hydroxide solution and extracted with benzene. The benzene is removed from the extract by distillation and the residue is taken up in isopropanol and converted to the hydrochloride salt by the addition of a small excess of concentrated hydrochloric acid. The crude hydrochloride salt which separates on dilution of the solution with an equal volume of water is collected, washed with benzene and recrystallized from 40% ethanol containing a small amount of hydrochloric acid. The product is 1-n-octyl-4-m-xylyl-5-imino-Δ²-tetrazoline hydrochloride; M. P. 163–164° C. This product has the formula,

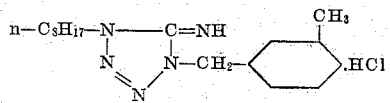

EXAMPLE 7

1-n-heptadecyl-4-p-xylyl-5-imino-Δ²-tetrazoline

A mixture consisting of 9.7 g. of 1-n-heptadecyl-5-aminotetrazole and 6.6 g. of p-xylyl bromide is heated at 125° C. for about six hours. The reaction mixture is taken up in a small amount of ethanol, the solution diluted with water and subjected to steam distillation. The residue is made alkaline with sodium hydroxide solution and extracted with benzene. The benzene extract is dried, the benzene distilled off and the residue taken up in isopropyl alcohol. The isopropanolic solution is treated with a small excess of concentrated hydrochloric acid and diluted with an equal volume of water. The precipitate is filtered off, washed with benzene and recrystallized from 40% ethanol, and acidified with hydrochloric acid. The product is 1-n-heptadecyl-4-p-xylyl-5-imino-Δ²-tetrazoline hydrochloride; M. P. 133–135° C. This product has the formula,

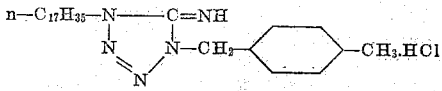

EXAMPLE 8

1-n-pentadecyl-4-m-xylyl-5-imino-Δ²-tetrazoline

A mixture consisting of 8.85 g. of 1-n-pentadecyl-5-aminotetrazole and 6.6 g. of m-xylylbromide is heated at 125° C. for about six hours. The crude hydrobromide salt which separates from the reaction is taken up in ethanol, the solution diluted with water and subjected to steam distillation. The residue is made alkaline with 20% sodium hydroxide solution and extracted with benzene. The benzene extract is dried and the solvent is then taken off. The residue is taken up in isopropanol containing a small excess of concentrated hydrochloric acid. The solution is diluted with water, the precipitate is collected and purified by recrystallization from 95% ethanol acidified with hydrochloric acid. The product is 1-n-pentadecyl-4-m-xylyl-5-imino-Δ²-tetrazoline hydro-chloride; M. P. 141–142° C. This product has the formula,

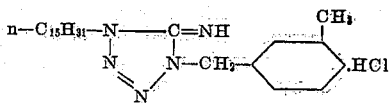

EXAMPLE 9

1-n-octyl-4-o-xylyl-5-imino-Δ²-tetrazoline (a) A mixture consisting of 8 g. of 1-n-octyl-5-aminotetrazole and 8.9 g. of o-xylyl bromide is heated at 125° C. for six hours. The crude hydrobromide salt which separates from the reaction mixture is taken up in ethanol and the solution diluted with water. This mixture is subjected to steam distillation to remove o-xylyl bromide and ethanol. The residual solution is made alkaline by the addition of 20% sodium hydroxide solution and extracted with benzene. The benzene extracts are dried and the benzene removed by distillation. The residue is taken up in isopropanol containing a slight excess of concentrated hydrochloric acid. The solution is diluted, the precipitate is filtered off and recrystallized from 30% ethanol acidified with hydrochloric acid. The product, 1-n-octyl-4-o-xylyl-5-imino-Δ²-tetrazoline hydrochloride, melts at 161–162° C. and has the formula,

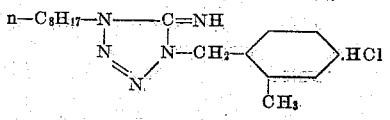

(b) 5 g. of 1-n-octyl-4-o-xylyl-5-imino-Δ²-tetrazoline hydrochloride is dissolved in hot water containing a small amount of ethanol and the resulting solution made alkaline with 20% sodium hydroxide solution. The free base of 1-n-octyl-4-o-xylyl-5-imino-Δ²-tetrazoline is extracted with benzene, the extract dried and the benzene removed by distillation in vacuo. The residue is taken up in anhydrous alcohol and treated with an aqueous solution containing tartaric acid. The solution is concentrated to the point of crystallization and the desired complex salt of 1-n-octyl-4-o-xylyl-5-imino-Δ²-tetrazoline containing two moles of tartaric acid and one mole of water to each mole of base, is collected.

EXAMPLE 10

1-n-octyl-4-p-xylyl-5-imino-Δ²-tetrazoline

A mixture of 8 g. of 1-n-octyl-5-aminotetrazole and 8.9 g. of p-xylyl bromide is heated at 125° C. for about six hours. The crude hydrobromide salt which separates is collected, taken up in a small amount of ethanol and the solution diluted with water. The solution is steam distilled to remove the ethanol and unreacted p-xylyl bromide. The residue is made alkaline with 20% sodium hydroxide solution and extracted with benzene. The benzene extracts are distilled and the residue taken up with a small amount of isopropanol containing a slight excess of concentrated hydrochloric acid. The solution is diluted, the precipitate is collected and recrystallized from 30% ethanol acidified with hydrochloric acid. The product is 1-n-octyl-4-p-xylyl-5-imino-Δ²-tetrazoline hydrochloride; M. P. 159–160° C. This product has the formula,

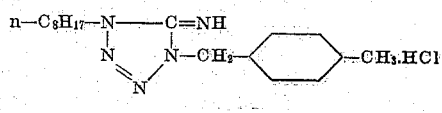

EXAMPLE 11

1-n-octyl-4-p-nitrobenzyl-5-imino-Δ²-tetrazoline

A mixture consisting of 8 g. of 1-n-octyl-5-aminotetrazole and 7.6 g. of p-nitrobenzyl chloride is heated at 125° C. for about ten hours. The crude reaction product is taken up in hot 95% ethanol, the solution diluted with water and subjected to steam distillation. The hot aqueous residue is made alkaline by the addition of 20% sodium hydroxide solution, cooled and extracted with several portions of benzene. The benzene extracts are dried and the benzene removed by distillation. The residual base is taken up in isopropanol and converted to hydrochloride by the addition of a slight excess of concentrated hydrochloric acid. The solution is diluted with water, the hydrochloride salt collected and purified by recrystallization from 40% ethanol; M. P. 168–169° C. The product, 1-n-octyl-4-p-nitrobenzyl-5-imino-$\Delta^2$-tetrazoline hydrochloride, has the formula,

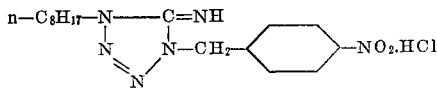

EXAMPLE 12

*1-n-nonyl-4-(2,4-dichlorobenzyl)-5-imino-$\Delta^2$-tetrazoline*

A mixture consisting of 8.4 g. of 1-n-nonyl-5-aminotetrazole and 9.8 g. of 2,4-dichlorobenzyl chloride is heated at 125° C. for ten hours. The reaction mixture is taken up in ethanol, diluted with water and subjected to steam distillation to remove any unreacted 2,4-dichlorobenzyl chloride. The residue is made alkaline with 20% sodium hydroxide solution and extracted with benzene. The benzene extracts are dried, distilled and the residue is taken up in isopropanol containing a slight excess of concentrated hydrochloric acid. This solution is diluted with water, the precipitate is filtered off, collected and recrystallized from 50% ethanol acidified with hydrochloric acid. The product is 1-n-nonyl-4-(2,4-dichlorobenzyl)-5-imino-$\Delta^2$-tetrazoline hydrochloride; M. P. 143–144° C. This product has the formula,

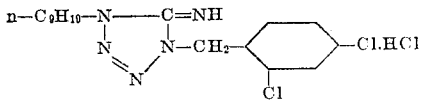

EXAMPLE 13

*1-n-heptadecyl-4-o-chlorobenzyl-5-imino-$\Delta^2$-tetrazoline*

A mixture consisting of 9.7 g. of 1-n-heptadecyl-5-aminotetrazole and 6.4 g. of o-chlorobenzyl chloride is heated at 125° C. for ten hours. As the heating continues, a clear homogeneous melt is formed from which the crude hydrochloride separates as the reaction continues. At the end of the heating period, the crude salt is collected and recrystallized from 95% ethanol containing a few drops of concentrated hydrochloric acid. The product is 1-n-heptadecyl-4-o-chlorobenzyl-5-imino-$\Delta^2$-tetrazoline hydrochloride; M. P. 143–145° C. This product has the formula,

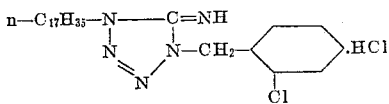

EXAMPLE 14

*1-n-tetradecyl-4-(3,4-dichlorobenzyl)-5-imino-$\Delta^2$-tetrazoline*

A mixture consisting of 8.4 g. of 1-n-tetradecyl-5-aminotetrazole and 7.8 g. of 3,4-dichlorobenzyl chloride is heated at 125° C. for ten hours. During the heating period, the crude hydrochloride salt separates from the reaction mixture. At the end of the heating period, the hydrochloride is collected and recrystallized from 95% ethanol which is acidified with a few drops of hydrochloric acid. The product is 1-n-tetradecyl-4-(3,4-dichlorobenzyl)-5-imino-$\Delta^2$-tetrazoline hydrochloride; M. P. 139–141° C. This product has the formula,

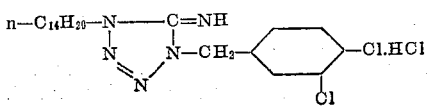

EXAMPLE 15

*1-n-octyl-4-(2-hydroxy-5-nitrobenzyl)-5-imino-$\Delta^2$-tetrazoline*

A mixture consisting of 4.9 g. of 1-n-octyl-5-aminotetrazole and 4.7 g. of 2-hydroxy-5-nitrobenzyl chloride is heated at 125° C. for four hours. The hydrochloride salt which separates is collected and recrystallized from 80% ethanol which is acidified with a few drops of concentrated hydrochloric acid. The product is 1-n-octyl-4-(2-hydroxy-5-nitrobenzyl)-5-imino-$\Delta^2$-tetrazoline hydrochloride; M. P. 184–186° C. with decomposition. This product has the formula,

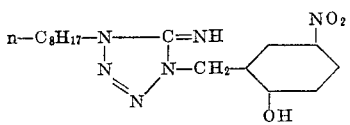

EXAMPLE 16

*1-n-octyl-4-p-methoxybenzyl-5-imino-$\Delta^2$-tetrazoline*

A mixture consisting of 8 g. of 1-n-octyl-5-aminotetrazole and 7.8 g. of p-methoxybenzyl chloride is heated at 125° C. for six hours. During the heating period, the hydrochloride salt separates and at the end of the heating period, the crude salt is collected and taken up in hot 95% ethanol. The solution is diluted with water and subjected to steam distillation. The residue is made alkaline by the addition of 20% sodium hydroxide solution and extracted with benzene. The benzene extracts are dried and the benzene removed by distillation. The crude 1-n-octyl-4-p-methoxybenzyl-5-imino-$\Delta^2$-tetrazoline is taken up in isopropanol and treated with an excess of concentrated hydrochloric acid. The solution is diluted with water and the precipitate is collected and recrystallized from 25% ethanol acidified with a few drops of concentrated hydrochloric acid. The product is 1-n-octyl-4-p-methoxybenzyl-5-imino-$\Delta^2$-tetrazoline hydrochloride; M. P. 155–156° C. This product has the formula,

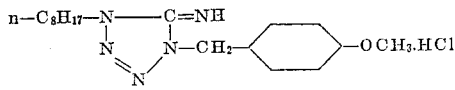

EXAMPLE 17

*1-n-octyl-4-(3,4-dichlorobenzyl)-5-imino-$\Delta^2$-tetrazoline*

A mixture consisting of 5 g. of 1-n-octyl-5-aminotetrazole and 6.5 g. of 3,4-dichlorobenzyl chloride is heated at 125° C. from eight to ten hours. The reaction mixture is taken up in alcohol, diluted with water and the mixture steam distilled. The residue is made alkaline with 25% sodium hydroxide solution, cooled and extracted with benzene. The benzene extracts are combined and distilled to obtain the free base, 1-n-octyl-4-(3,4-dichlorobenzyl)-5-imino-$\Delta^2$-tetrazoline. This base is taken up in 95% ethanol and converted to the hydrochloride salt by the addition of concentrated hydrochloric acid. The solution is diluted, the precipitate is collected and recrystallized from 50% ethanol containing a few drops of concentrated hydrochloric acid. The product is 1-n-octyl-4-(3,4-dichlorobenzyl)-5-imino-$\Delta^2$-tetrazoline hydrochloride; M. P. 159–160° C. The formula of this product is,

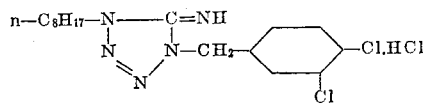

EXAMPLE 18

*1-n-octyl-4-(2,4-dichlorobenzyl)-5-imino-$\Delta^2$-tetrazoline*

A mixture consisting of 5 g. of 1-n-octyl-5-aminotetrazole and 6 g. of 2,4-dichlorobenzyl chloride is heated at 125° C. for eight to ten hours. The reaction mixture is taken up in a small amount of ethanol, diluted with water and subjected to steam distillation. The aqueous residue is made strongly alkaline with 25% sodium hydroxide solution, cooled and extracted with benzene. The benzene extracts are dried and the benzene is taken off by distillation to obtain 1-n-octyl-4-(2,4-dichlorobenzyl)-5-imino-Δ²-tetrazoline. The free base is taken up in ethanol and the solution treated with an excess of concentrated hydrochloric acid. Dilution with water causes the hydrochloride salt to separate. The salt is collected, washed with benzene and recrystallized from 50% ethanol acidified with hydrochloric acid. The product is 1-n-octyl-4-(2,4-dichlorobenzyl)-5-imino-Δ²-tetrazoline hydrochloride; M. P. 168–169° C. The formula of this product is,

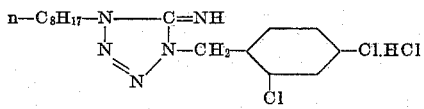

EXAMPLE 19

*1-n-undecyl-4-p-chlorobenzyl-5-imino-Δ²-tetrazoline*

A mixture consisting of 12 g. of 1-n-undecyl-5-aminotetrazole and 10 g. of p-chlorobenzyl chloride is heated at 120–125° C. for twelve hours. During the heating period, the crude hydrochloride salt of 1-n-undecyl-4-p-chlorobenzyl-5-imino-Δ²-tetrazoline separates from the solution. The crude hydrochloride is collected, dissolved in ethanol, diluted with water and subjected to steam distillation. The residue is made strongly alkaline with 25% sodium hydroxide solution, cooled, extracted with benzene and the benzene removed by distillation to yield 1-n-undecyl-4-p-chlorobenzyl-5-imino-Δ²-tetrazoline. The free base is taken up in 50 ml. of isopropanol and treated with 10 ml. of concentrated hydrochloric acid. The solution is diluted with 40 ml. of water which causes the precipitation of the hydrochloride salt. The hydrochloride is collected and recrystallized from 40% ethanol acidified with hydrochloric acid. The product is 1-n-undecyl-4-p-chlorobenzyl-5-imino-Δ²-tetrazoline hydrochloride; M. P. 145–146° C. This product has the formula,

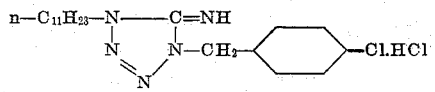

The reaction in accordance with the invention can be carried out with other mono- and di-halo aralkyl halides. For instance, when using p-bromo-benzyl chloride in accordance with the example, the product is 1-n-undecyl-4-p-bromobenzyl-5-imino-Δ²-tetrazoline which in the hydrochloric acid addition salt form has the formula,

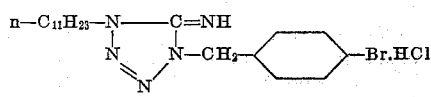

EXAMPLE 20

*1-n-pentadecyl-4-benzyl-5-imino-Δ²-tetrazoline*

A mixture consisting of 9 g. of 1-n-pentadecyl-5-aminotetrazole and 4.6 g. of benzyl chloride is heated at 120–125° C. for about six hours. The solid reaction product is taken up and recrystallized from hot 95% ethanol acidified with hydrochloric acid. The product is 1-n-pentadecyl-4-benzyl-5-imino-Δ²-tetrazoline hydrochloride; M. P. 152.5–153.5° C. This product has the formula,

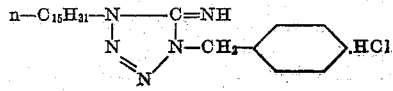

EXAMPLE 21

*1-n-tetradecyl-4-benzyl-5-imino-Δ²-tetrazoline*

A mixture consisting of 8.5 g. of 1-n-tetradecyl-5-aminotetrazole and 4.6 g. of benzyl chloride is heated at 125° C. for about six hours. The crystalline mass is taken up and recrystallized from hot 80% ethanol acidified with hydrochloric acid. The product is 1-n-tetradecyl-4-benzyl-5-imino-Δ²-tetrazoline hydrochloride; M. P. 153–154° C. This product has the formula,

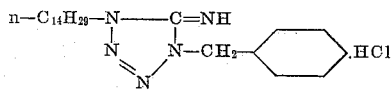

EXAMPLE 22

*1-n-tridecyl-4-benzyl-5-imino-Δ²-tetrazoline*

A mixture consisting of 8 g. of 1-n-tridecyl-5-aminotetrazole and 4.6 g. of benzyl chloride is heated at 125° C. for about six hours. The crystalline reaction mixture is taken up and recrystallized from hot 90% ethanol containing a little hydrochloric acid. The product is 1-n-tridecyl-4-benzyl-5-imino-Δ²-tetrazoline hydrochloride; M. P. 155–156.5° C. This product has the formula,

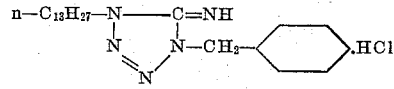

EXAMPLE 23

*1-n-decyl-4-benzyl-5-imino-Δ²-tetrazoline*

A mixture consisting of 9 g. of 1-n-decyl-5-aminotetrazole and 6 g. of benzyl chloride is heated at 125° C. for six hours. The crystalline reaction mixture is taken up and recrystallized from 70% ethanol acidified with a little hydrochloric acid. The product is 1-n-decyl-4-benzyl-5-imino-Δ²-tetrazoline hydrochloride; M. P. 156–157° C. This product has the formula,

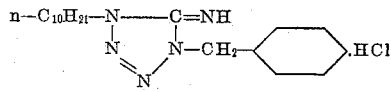

EXAMPLE 24

*1-n-nonyl-4-benzyl-5-imino-Δ²-tetrazoline*

A mixture consisting of 8.5 g. of 1-n-nonyl-5-aminotetrazole and 6 g. of benzyl chloride is heated at 125° C. for six hours. The crystalline reaction mixture is taken up and recrystallized twice from 70% ethanol acidified with hydrochloric acid. The product is 1-n-nonyl-4-benzyl-5-imino-Δ²-tetrazoline hydrochloride; M. P. 161–162° C. This product has the formula,

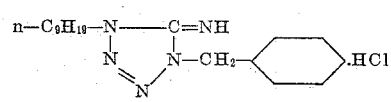

EXAMPLE 25

*1-n-hexyl-4-p-chlorobenzyl-5-imino-Δ²-tetrazoline*

A mixture consisting of 7.5 g. of 1-n-hexyl-5-aminotetrazole and 8.5 g. of p-chlorobenzyl chloride is heated for six hours at 125° C. The crystalline reaction mixture is taken up and recrystallized twice from 60% ethanol acidified with hydrochloric acid. The product thus obtained is 1-n-hexyl-4-p-chlorobenzyl-5-imino-Δ²-tetrazoline hydrochloride; M. P. 166–167° C. This product has the formula,

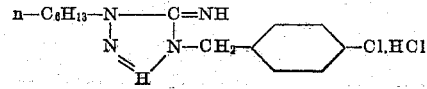

EXAMPLE 26

*1-n-heptyl-4-p-chlorobenzyl-5-imino-Δ²-tetrazoline*

A mixture consisting of 9 g. of 1-n-heptyl-5-aminotetrazole and 9 g. of p-chlorobenzyl chloride is heated for six to eight hours at 125° C. The crystalline reaction mass is taken up and recrystallized twice from 70% ethanol acidified with hydrochloric acid. The product is 1-n-heptyl-4-p-chlorobenzyl-5-imino-Δ²-tetrazoline hydrochloride; M. P. 151–152° C. This product has the formula,

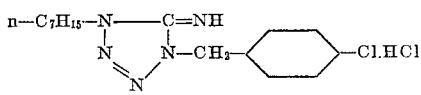

EXAMPLE 27

*1-n-nonyl-4-p-chlorobenzyl-5-imino-Δ²-tetrazoline*

A mixture consisting of 8.5 g. of 1-n-nonyl-5-aminotetrazole and 7 g. of p-chlorobenzyl chloride is heated for six hours at 125° C. The reaction mass is taken up in hot 70% ethanol acidified with hydrochloric acid and recrystallized. The product is 1-n-nonyl-4-p-chlorobenzyl-5-imino-Δ²-tetrazoline hydrochloride; M. P. 152–153.5° C. This product has the formula,

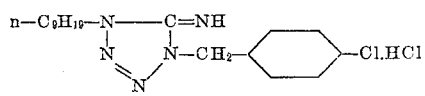

EXAMPLE 28

*1-n-decyl-4-p-chlorobenzyl-5-imino-Δ²-tetrazoline*

A mixture consisting of 9 g. of 1-n-decyl-5-aminotetrazole and 7 g. of p-chlorobenzyl chloride is heated at 125° C. for six hours. The crystalline reaction mixture is taken up and recrystallized twice from 70% ethanol acidified with hydrochloric acid. The product is 1-n-decyl-4-p-chlorobenzyl-5-imino-Δ²-tetrazoline hydrochloride; M. P. 152–154° C. This product has the formula,

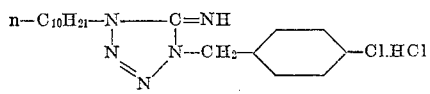

EXAMPLE 29

*1-n-octyle-4-benzyl-5-imino-Δ²-tetrazoline*

A mixture consisting of 8.75 g. of 1-benzyl-5-aminotetrazole and 10.5 g. of n-octyl bromide is heated at 135° C. for eight hours. The reaction mixture is cooled, taken up in 75 ml. of 95% ethanol, diluted with water to about 500 ml. and subjected to steam distillation. The residue is made alkaline by addition of sodium hydroxide solution and extracted successively in three portions with benzene. The combined extracts are dried, the solvent is removed by evaporation and the residue is taken up in isopropanol and converted to the hydrochloride salt by addition a small excess of concentrated hydrochloric acid. The crude hydrochloride which separates on dilution of the solution with 150 ml. of water is collected, washed with benzene and recrystallized from ethanol containing a small amount of hydrochloric acid. The product is 1 - n-octyl-4-benzyl-5-imino-Δ²-tetrazoline hydrochloride of the formula,

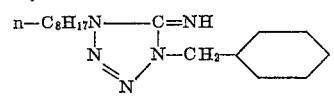

which is identical to the product of Example 1.

EXAMPLE 30

*1-n-octyl-4-p-chlorobenzyl-5-imino-Δ²-tetrazoline*

A mixture consisting of 10 g. of 1-p-chlorobenzyl-5-aminotetrazole and 12 g. of n-octyl bromide is heated for approximately twenty hours at 125° C. The reaction mixture is cooled and worked up in accordance with the procedure set forth under Example 29. The product is 1 - n-octyl-4-p-chlorobenzyl-5-imino-Δ²-tetrazoline hydrochloride; M. P. 165.5-166.5° C. This product has the formula,

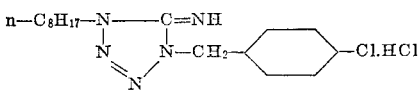

The product is identical to that prepared in Example 2.

EXAMPLE 31

*1-n-hexyl-4-p-chlorobenzyl-5-imino-Δ²-tetrazoline*

A mixture consisting of 15 g. of 1-p-chlorobenzyl-5-aminotetrazole and 12 g. of n-octyl bromide is heated at 120-125° C. for about twenty-four hours. The reaction mixture is cooled and worked up in accordance with the procedure set forth under Example 29. The product is 1-n-hexyl-4-p-chlorobenzyl-5-imino-Δ²-tetrazoline hydrochloride of the formula,

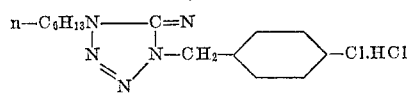

EXAMPLE 32

*1-n-decyl-4-p-chlorobenzyl-5-imino-Δ²-tetrazoline*

A mixture consisting of 15 g. of 1-p-chlorobenzyl-5-aminotetrazole and 20 g. of n-decyl bromide is heated at 120-125° C. for about twenty four hours. The reaction mixture is cooled and worked up in accordance with the procedure set forth under Example 29. The product is 1 - n-decyl-4-p-chlorobenzyl-5-imino-Δ²-tetrazoline hydrochloride of the formula,

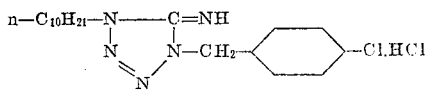

EXAMPLE 33

*1-n-nonyl-4-benzyl-5-imino-Δ²-tetrazoline*

A mixture consisting of 15 g. of 1-benzyl-5-aminotetrazole and 15 g. of n-nonyl bromide is heated at 120-125° C. for about twenty-four hours. The reaction mixture is cooled and worked up in accordance with the procedure set forth under Example 29. The product is 1-n-nonyl-4-benzyl-5-imino-Δ²-tetrazoline hydrochloride; M. P. 161-162° C. This product has the formula,

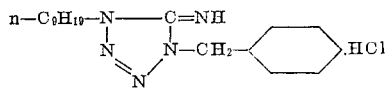

EXAMPLE 34

*1-n-octyl-4-(β-phenylethyl)-5-imino-Δ²-tetrazoline*

(a) A mixture consisting of 9.9 g. of 1-n-octyl-5-aminotetrazole and 10.2 g. of β-phenylethyl bromide is heated at 125-130° C. for seven hours. The reaction mixture is cooled, taken up in 50 ml. of 95% ethanol, diluted with 500 ml. of water and distilled to remove the ethanol and excess β-phenylethyl bromide. The residue is made alkaline by the addition of 20% sodium hydroxide solution and extracted with benzene. The benzene extracts are dried over anhydrous potassium carbonate and the benzene is removed by distillation in vacuo. The residual product, 1 - n-octyl-4-(β-phenylethyl)-5-imino-Δ²-tetrazoline, has the formula,

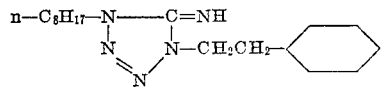

(b) The product of (a) is taken up in 30 ml. of isopropanol, mixed with 10 ml. of concentrated hydrochloric acid, heated to the boiling point and diluted with 60 ml. of water. The hydrochloride salt which separates on cooling is collected, recrystallized first from benzene and then from water, and dried at 100° C. The product is 1-n-octyl-4-(β-phenylethyl)-5-imino-Δ²-tetrazoline hydrochloride; M. P. 207-208° C. This product has the formula,

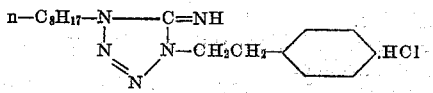

EXAMPLE 35

*1-n-octyl-4-(γ-phenylpropyl)-5-imino-Δ²-tetrazoline*

(a) A mixture consisting of 9.9 g. of 1-n-octyl-5-aminotetrazole and 11 g. of γ-phenylpropyl bromide is heated at 125-130° C. for seven hours. The reaction mixture is cooled, taken up in 50 ml. of 95% ethanol, diluted with 500 ml. of water and distilled to remove the ethanol and excess γ-phenylpropyl bromide. The residue is made alkaline by the addition of 20% sodium hydroxide solution, cooled and extracted with benzene. The benzene extracts are dried over anhydrous potassium carbonate and the benzene is removed by distillation in vacuo. The residual product, 1-n-octyl-4-(γ-phenylpropyl)-5-imino-Δ²-tetrazoline, has the formula,

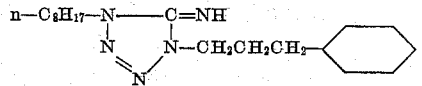

(b) The product of (a) is taken up in 30 ml. of isopropanol, mixed with 10 ml. of concentrated hydrochloric acid, heated to the boiling point and diluted with 60 ml. of water. The hydrochloride salt which separates is collected, recrystallized first from benzene and then from water, and dried at 100° C. The product is 1-n-octyl-4-(γ-phenylpropyl)-5-imino-Δ²-tetrazoline hydrochloride; M. P. 153-154° C. This product has the formula,

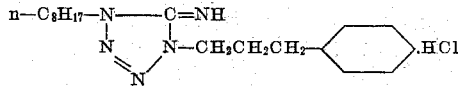

EXAMPLE 36

*1-n-amyl-4-p-chlorobenzyl-5-imino-Δ²-tetrazoline*

(a) A mixture consisting of 12.4 g. of 1-n-amyl-5-aminotetrazole and 14.1 g. of p-chlorobenzyl chloride is heated for six hours at 125° C. The reaction mixture is cooled, taken up in 95% ethanol, diluted with 500 ml. of water and distilled to remove the ethanol and excess p-chlorobenzyl chloride. The residue is made alkaline by the addition of 20% sodium hydroxide solution, cooled and extracted with benzene. The benzene extracts are dried over anhydrous potassium carbonate and the benzene is removed by distillation in vacuo. The residual product, 1-n-amyl-4-p-chlorobenzyl-5-imino-Δ²-tetrazoline, has the formula,

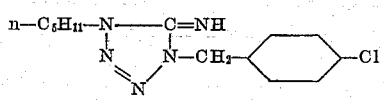

(b) The product of (a) is taken up in isopropanol, mixed with 10 ml. of concentrated hydrochloric acid, heated to the boiling point and diluted with 60 ml. of water. The hydrochloride salt which separates is collected, recrystallized first from benzene and then from water, and dried at 100° C. The product is 1-n-amyl-4-p-chlorobenzyl-5-imino-Δ²-tetrazoline hydrochloride; M. P. 151.5-152.5° C. This product has the formula,

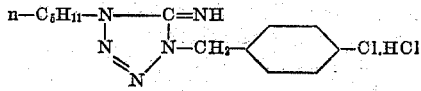

EXAMPLE 37

*1-n-hexyl-4-(β-phenylethyl)-5-imino-Δ²-tetrazoline*

(a) A mixture consisting of 8.4 g. of 1-n-hexyl-5-aminotetrazole and 11.1 g. of β-phenylethyl bromide is heated at 125-130° C. for seven hours. The reaction mixture is cooled, taken up in 50 ml. of 95% ethanol, diluted with 500 ml. of water and distilled to remove the ethanol and excess β-phenylethyl bromide. The residue is made alkaline by the addition of 20% sodium hydroxide solution and extracted with benzene. The benzene extracts are dried over anhydrous potassium carbonate and the benzene is removed by distillation in vacuo. The residual product, 1-n-hexyl-4-(β-phenylethyl)-5-imino-Δ²-tetrazoline, has the formula,

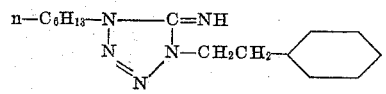

(b) The product of (a) is taken up in isopropanol, mixed with 10 ml. of concentrated hydrochloric acid, heated to the boiling point and diluted with 60 ml. of water. The hydrochloride salt which separates on cooling is collected, recrystallized first from benzene and then from water and dried at 100° C. The product is 1-n-hexyl-4-(β-phenylethyl)-5-imino-Δ²-tetrazoline hydrochloride; M. P. 229-230° C. This product has the formula,

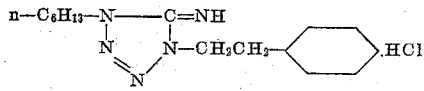

EXAMPLE 38

*1-n-decyl-4-(β-phenylethyl)-5-imino-Δ²-tetrazoline*

Using as starting materials 6.7 g. of 1-n-decyl-5-aminotetrazole and 6.5 g. of β-phenylethyl bromide, the same procedure as described in Example 37 is followed. The product isolated following treatment of the tetrazoline base with hydrochloric acid is 1-n-decyl-4-(β-phenylethyl)-5-imino-Δ²-tetrazoline hydrochloride. This product has the formula,

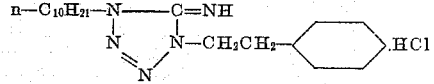

EXAMPLE 39

*1-n-hexyl-4-(γ-phenylpropyl)-5-imino-Δ²-tetrazoline*

(a) A mixture consisting of 5.1 g. of 1-n-hexyl-5-aminotetrazole and 7.2 g. of γ-phenylpropyl bromide is heated at 125-130° C. for seven hours. The reaction mixture is cooled, taken up in 95% ethanol, diluted with 500 ml. of water and distilled to remove the ethanol and excess γ-phenylpropyl bromide. The residue is made alkaline by the addition of 20% sodium hydroxide solution, cooled and extracted with benzene. The benzene extracts are dried and the benzene is removed by distillation in vacuo. The residual product, 1-n-hexyl-4-(γ-phenylpropyl)-5-imino-Δ²-tetrazoline, has the formula,

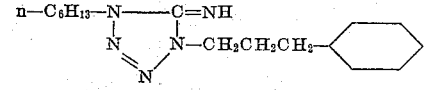

(b) The product of (a) is taken up in isopropanol, mixed with an excess of concentrated hydrochloric acid, heated to the boiling point and diluted with 60 ml. of water. The hydrochloride salt which separates is collected, recrystallized first from a 2:1 benzene-cyclohexane mixture and then from water, and dried at 100° C. The product is 1-n-hexyl-4-(γ-phenylpropyl)-5-imino-Δ²-tetrazoline hydrochloride; M. P. 171-172° C. This product has the formula,

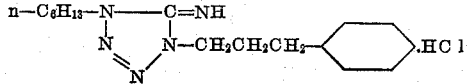

EXAMPLE 40

1-n-amyl-4-(δ-phenylbutyl)-5-imino-Δ²-tetrazoline

A mixture consisting of 12.4 g. of 1-n-amyl-5-aminotetrazole and 18.7 g. of δ-phenylbutyl bromide is heated at 125–130° C. for seven hours. The reaction mixture is cooled, taken up in a minimum amount of 95% ethanol, diluted with 500 ml. of water and distilled to remove the ethanol and excess δ-phenylbutyl bromide. The residue is made alkaline by the addition of 20% sodium hydroxide, solution, cooled and extracted with benzene. The benzene extracts are concentrated in vacuo and the residue is taken up in 95% ethanol. The solution is treated with 15 ml. of concentrated hydrochloric acid, heated to the boiling point and diluted with 60 ml. of water. The hydrochloride salt which separates is collected, recrystallized from benzene and from water, and dried. The product is 1-n-amyl-4-(δ-phenylbutyl)-5-imino-Δ²-tetrazoline hydrochloride, having the formula, $$n-C_5H_{11}-N-C=NH$$
$$\quad\quad | \quad\quad |$$
$$\quad N \quad\; N-CH_2CH_2CH_2CH_2-\langle\;\rangle\cdot HCl$$
$$\quad\;\backslash\!\!/$$
$$\quad\;\; N$$

The 1-alkyl-5-aminotetrazoles and 1-aralkyl-5-aminotetrazoles used as starting materials in the practice of the invention, can be prepared by the reaction of an alkyl or an aralkyl cyanide with hydrozoic acid in the presence of a strong mineral acid such as sulfuric acid at a temperature between about 30 and 50° C. In carrying out the reaction, the strong mineral acid is added slowly to a solution of the alkyl or aralkyl cyanide and hydrozoic acid in a solvent such as benzene or toluene. For instance, the starting material used in Example 1, 1-n-octyl-5-aminotetrazole, can be prepared as follows:

A mixture consisting of 70 g. of n-octyl cyanide and 350 cc. of a 16% solution of hydrazoic acid in benzene is stirred vigorously while 150 cc. of concentrated sulfuric acid is added slowly to the mixture. The temperature during the addition is maintained at about 30 to 35° C. The organic layer is separated and the acidic aqueous layer poured onto 1 kg. of ice. Enough 50% potassium hydroxide solution is added to the aqueous solution to render it neutral to litmus and the precipitate which forms is collected by filtration. The moist filter cake is extracted first with 1250 cc. of boiling isopropanol and then with 1000 cc. of boiling 87% isopropanol. The first extract upon cooling yields 25.7 g. of crude product. The mother liquor is combined with the second extract from which an additional 24.3 g. of product is obtained upon cooling and concentrating the mixture. Recrystallization of the total crude product from two parts of 87% isopropanol and one part of water yields 47 g. of pure 1-n-octyl-5-aminotetrazole; M. P. 161–2° C.

What I claim is:

1. A compound of the class consisting of a free base and its acid addition salts, said free base having the formula, $$R-N-C=NH$$
$$\; | \quad\quad |$$
$$\; N \quad N-Z-\langle\;\rangle-Y$$
$$\;\backslash\!\!/\quad\quad\quad\quad\; X$$
$$\; N$$

where X and Y are members of the class consisting of hydrogen, halogen, hydroxy, lower alkyl, lower alkoxy and nitro groups, Z is a divalent alkylene group containing from 1 to 4 carbon atoms inclusive, and R is an alkyl group containing from 5 to 17 carbon atoms inclusive.

2. An acid addition salt of 1-n-octyl-4-benzyl-5-imino-Δ²-tetrazoline.
3. 1-n-octyl-4-benzyl-5-imino-Δ²-tetrazoline hydrochloride.
4. 1-n-octyl-4-benzyl-5-imino-Δ²-tetrazoline.
5. An acid addition salt of 1-n-octyl-4-p-chlorobenzyl-5-imino-Δ²-tetrazoline.
6. 1-n-octyl-4-p-chlorobenzyl-5-imino-Δ²-tetrazoline hydrochloride.
7. 1-n-octyl-4-p-chlorobenzyl-5-imino-Δ²-tetrazoline.
8. An acid addition salt of 1-n-decyl-4-p-chlorobenzyl-5-imino-tetrazoline.
9. 1-n-decyl-4-p-chlorobenzyl-5-imino-Δ²-tetrazoline hydrochloride.
10. An acid addition salt of 1-n-nonyl-4-benzyl-5-imino-Δ²-tetrazoline.
11. 1-n-nonyl-4-benzyl-5-imino-Δ²-tetrazoline hydrochloride.
12. A process for obtaining a 1-alkyl-4-aralkyl-5-imino-Δ²-tetrazoline compound of formula, $$R-N-C=NH$$
$$\; | \quad\quad |$$
$$\; N \quad N-Z-\langle\;\rangle-Y$$
$$\;\backslash\!\!/\quad\quad\quad\quad\; X$$
$$\; N$$

which comprises condensing a 5-aminotetrazole compound of formula, $$P-N-C-NH_2$$
$$\; | \quad\quad\; ||$$
$$\; N \quad\;\; N$$
$$\;\backslash\!\!/$$
$$\; N$$

where P is a member of the class consisting of alkyl radicals containing 5 to 17 carbon atoms inclusive and aralkyl radicals of formula, $$\langle\;\rangle-Z-$$

with an aralkyl halide of formula, $$\langle\;\rangle-Z-Hal$$

in the case where P in the 5-aminotetrazole compound is an alkyl radical and with an alkyl halide of formula, R-Hal, in the case where P in the 5-aminotetrazole compound is an aralkyl radical; where Hal is a halogen atom, R is an alkyl radical containing from 5 to 17 carbon atoms inclusive, X and Y are members of the class consisting of hydrogen, halogen, hydroxy, lower alkyl, lower alkoxy and nitro groups; and Z is a divalent alkylene group containing from 1 to 4 carbon atoms inclusive.

13. A process for obtaining a 1-alkyl-4-aralkyl-5-imino-Δ²-tetrazoline compound of formula, $$R-N-C=NH$$
$$\; | \quad\quad |$$
$$\; N \quad N-Z-\langle\;\rangle-Y$$
$$\;\backslash\!\!/\quad\quad\quad\quad\; X$$
$$\; N$$

which comprises condensing an aralkyl halide of formula, $$\langle\;\rangle-Z-Hal$$

with a 1-alkyl-5-aminotetrazole of formula, $$R-N-C-NH_2$$
$$\; | \quad\quad\; ||$$
$$\; N \quad\;\; N$$
$$\;\backslash\!\!/$$
$$\; N$$

where X and Y are members of the class consisting of hydrogen, halogen, hydroxy, lower alkyl, lower alkoxy and nitro groups, Hal is a halogen atom, R is an alkyl group containing 5 to 17 carbon atoms inclusive, and Z is a divalent alkylene group containing from 1 to 4 carbon atoms inclusive.

14. A process for obtaining a 1-alkyl-4-aralkyl-5-imino-Δ²-tetrazoline compound according to claim 12 in which X and Y each represent hydrogen.

15. A process for obtaining a 1-alkyl-4-aralkyl-5-imino-Δ²-tetrazoline compound according to claim 12 in which X represents hydrogen and Y represents halogen.

16. A process for obtaining a 1-alkyl-4-aralkyl-5-imino-$\Delta^2$-tetrazoline compound of formula,

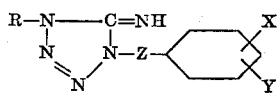

which comprises condensing an alkyl halide compound of the formula, R-Hal, with a 1-aralkyl-5-amino tetrazole of the formula,

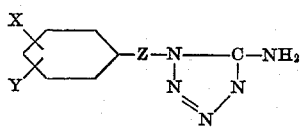

where X and Y are members of the class consisting of hydrogen, halogen, hydroxy, lower alkyl, lower alkoxy and nitro groups, Hal is a halogen atom and R is an alkyl group containing 5 to 17 carbon atoms inclusive, and Z is a divalent alkylene group containing from 1 to 4 carbon atoms inclusive.

17. A process for obtaining a 1-alkyl-4-aralkyl-5-imino-$\Delta^2$-tetrazoline compound according to claim 15 in which X and Y each represent hydrogen.

18. A process for obtaining a 1-alkyl-4-aralkyl-5-imino-$\Delta^2$-tetrazoline compound according to claim 15 in which X represents hydrogen and Y represents halogen.

References Cited in the file of this patent

Herbst et al.: Chem. Abstracts, vol. 45, cols. 6629–30 (1951).